(12) United States Patent
Chapin et al.

(10) Patent No.: US 7,651,107 B1
(45) Date of Patent: Jan. 26, 2010

(54) SUSPENSION DEFLECTION SYSTEM (75) Inventors: Jeffrey R. Chapin, Whitmore Lake, MI (US); Todd W. Gilbert, Vancouver, WA (US); James V. McHorse, Portland, OR (US); Gregory S. Cooper, Portland, OR (US)

(73) Assignee: Daimler Trucks North America LLC, Portland, OR (US)

( * ) Notice: Subject to any disclaimer, the term of this patent is extended or adjusted under 35 U.S.C. 154(b) by 0 days.

(21) Appl. No.: 10/206,905

(22) Filed: Jul. 25, 2002

(51) Int. Cl.
*B60G 9/00* (2006.01)
(52) U.S. Cl. .................. 280/124.165; 280/124.177; 280/681; 280/687; 267/192
(58) Field of Classification Search .............. 280/124.1, 280/124.11, 124.162, 124.163, 124.164, 280/124.165, 124.17, 124.171, 124.174, 280/124.175, 124.176, 124.177, 124.179, 280/681, 687; 267/7, 28, 192, 193, 25, 27, 267/29–32, 36.1, 37.1, 37.2, 37.3, 37.4, 38–53, 267/189, 201, 219, 227, 229, 246, 257, 260–271, 267/279, 283, 292, 293, 294
See application file for complete search history.

(56) References Cited

U.S. PATENT DOCUMENTS

| 1,400,563 | A | * | 12/1921 | Masury et al. ................. 267/30 |
| 1,566,026 | A | * | 12/1925 | Leipert et al. ................. 267/30 |
| 1,605,363 | A | | 11/1926 | Masury et al. |
| 1,646,755 | A | | 10/1927 | Leipert |
| 1,703,297 | A | | 2/1929 | Chase |
| 1,735,982 | A | * | 11/1929 | Short .......................... 267/30 |
| 1,818,758 | A | | 8/1931 | Saurer |
| 2,126,130 | A | * | 8/1938 | Nallinger ..................... 267/231 |
| 2,192,391 | A | * | 3/1940 | Weber .......................... 267/260 |
| 2,192,646 | A | * | 3/1940 | Lindeman ..................... 267/53 |
| 2,708,111 | A | * | 5/1955 | Sturtevant ..................... 267/49 |
| 2,861,798 | A | * | 11/1958 | Lenet et al. ................... 267/45 |
| 2,920,884 | A | * | 1/1960 | Rowland et al. .............. 267/49 |
| 2,929,618 | A | * | 3/1960 | Hutchens ..................... 267/30 |
| 3,063,732 | A | * | 11/1962 | Harbers et al. ............. 280/6.16 |
| 3,250,546 | A | | 5/1966 | Allison |

(Continued)

FOREIGN PATENT DOCUMENTS

GB          2177981      *   2/1987

(Continued)

OTHER PUBLICATIONS

English translation of Japanese patent 05-196078, Makoto Tomita, Aug. 1993.*

*Primary Examiner*—David J Parsley
(74) *Attorney, Agent, or Firm*—Klarquist Sparkman, LLP (57) ABSTRACT

A suspension deflection system is provided that includes first and second spaced apart supports, an elastomeric body positioned at least partially in the region between the first and second supports, and a suspension engaging projection extending from the second support in a direction away from the first support. The elastomeric body includes first and second opposed body end surfaces coupled respectively to the first and second supports, and first and second body side surfaces extending between the body end surfaces. The body side surfaces are closer to one another at a location intermediate to the body end surfaces than at the first and second supports. The system conveniently and securely couples a suspension member of a vehicle engaged by the projection to a frame of the vehicle.

18 Claims, 4 Drawing Sheets

U.S. PATENT DOCUMENTS

| | | | | |
|---|---|---|---|---|
| 3,499,660 | A | * | 3/1970 | Raidel .................. 280/682 |
| 3,591,197 | A | * | 7/1971 | Haley .................. 280/682 |
| 3,614,123 | A | * | 10/1971 | Raidel .................. 280/686 |
| 3,693,964 | A | | 9/1972 | McGee |
| 3,707,297 | A | * | 12/1972 | Perreault et al. .............. 280/25 |
| 3,792,871 | A | * | 2/1974 | Chalmers .................. 280/681 |
| 4,022,449 | A | * | 5/1977 | Estorff .................. 267/48 |
| 4,131,297 | A | * | 12/1978 | Raidel .................. 280/682 |
| 4,132,433 | A | * | 1/1979 | Willetts .............. 280/124.162 |
| 4,141,428 | A | * | 2/1979 | Loeb .................. 180/349 |
| 4,508,325 | A | * | 4/1985 | Marsh .................. 267/47 |
| 4,598,900 | A | * | 7/1986 | Yamamoto et al. .......... 267/52 |
| 4,630,804 | A | * | 12/1986 | Fesko .................. 267/52 |
| 4,671,535 | A | * | 6/1987 | Hanson et al. ........ 280/124.104 |
| 4,750,718 | A | * | 6/1988 | Nickel .................. 267/49 |
| 4,801,129 | A | * | 1/1989 | Wells .................. 267/52 |
| 4,895,350 | A | * | 1/1990 | Schoof et al. .................. 267/52 |
| 4,988,080 | A | * | 1/1991 | Shah .................. 267/30 |
| 5,007,660 | A | * | 4/1991 | Orndorff, Jr. et al. . 280/124.102 |
| 5,114,178 | A | * | 5/1992 | Baxter .................. 280/124.177 |
| 5,219,151 | A | * | 6/1993 | Stewart et al. .............. 267/262 |
| 5,826,896 | A | * | 10/1998 | Baumann ............. 280/124.171 |
| 6,056,276 | A | * | 5/2000 | Muzio .................. 267/36.1 |
| 6,073,714 | A | | 6/2000 | McHorse et al. |
| 6,092,819 | A | * | 7/2000 | Overby et al. ......... 280/124.153 |
| 6,206,407 | B1 | | 3/2001 | Fuchs et al. |
| 6,220,580 | B1 | * | 4/2001 | Balczun .................. 267/7 |
| 6,257,606 | B1 | | 7/2001 | Hynes et al. |
| 6,340,165 | B1 | * | 1/2002 | Kelderman .......... 280/124.153 |
| 6,371,466 | B1 | * | 4/2002 | Spears .................. 267/265 |
| 6,478,321 | B1 | * | 11/2002 | Heitzmann ........... 280/124.177 |

FOREIGN PATENT DOCUMENTS

| | | | |
|---|---|---|---|
| JP | 59-89839 | * | 5/1984 |
| JP | 5-196078 | * | 8/1993 |
| JP | 11-166827 | * | 6/1998 |
| WO | WO 00/20774 | * | 4/2000 |

* cited by examiner

SUSPENSION DEFLECTION SYSTEM

BACKGROUND

The present invention is related to vehicle suspension systems, and more specifically to the front suspension systems.

Numerous suspension systems exist for supporting the weight of trucks. A number of known designs utilize elastomers to achieve a non-metallic connection between the suspension member, which is typically a leaf spring assembly, and the vehicle frame. Non-metallic connections are useful in damping vibrations transmitted from the road or other surface from reaching the frame of the vehicle, while reducing the amount of noise that would be associated with metal-to-metal connections. Despite these advantages, these designs suffer from a number of disadvantages.

Most designs do not include adequate safety provisions for use of the vehicle in a variety of situations. Those designs that do include safety provisions inhibit the movement of the suspension elements over their useful ranges of motion. Many of these designs also include couplings that are difficult to secure. In order to assemble the elastomer to the suspension member together, many of the designs require complicated mounting procedures involving tools and are difficult to manipulate.

SUMMARY

It would be desirable to provide a suspension deflection system that provides containment of a suspension member in such events as failure of the elastomeric component and front and rear collisions, while allowing movement of the suspension member within its range of motion.

It would be further desirable to provide such a suspension deflection system that is easily mounted.

Described below is a suspension deflection system for coupling a suspension member to the frame of a vehicle. The system includes first and second spaced apart supports with an elastomeric body positioned at least partially in the region between the first second supports. The system also includes a suspension engaging projection extending from the second support in a direction away from the first support.

The elastomeric body includes first and second opposed body end surfaces coupled respectively to the first and second supports. The elastomeric body also includes first and second body side surfaces extending between the body end surfaces, the body side surfaces being closer to one another at a location intermediate to the body end surfaces than at the first and second supports. The first and second body side surfaces may be inwardly curved or concave. The elastomeric body is preferably formed of rubber.

The second support may include first and second major support surfaces, the second body end surface being coupled to the first major support surface. An elastomeric cushion may be coupled to the second major support surface. The suspension engaging projection preferably includes a proximal portion adjacent the second support and a distal end portion spaced from the second support, while the distal end portion may have a generally triangular configuration. In one specific implementation, the suspension engaging projection includes a first edge portion facing in the same direction as the first body side surface and a second edge portion facing in the same direction as the second body side surface. The first and second edge portions have respective portions which converge as the extension extends in a direction away from the second support.

In another implementation, the suspension deflection apparatus includes a coupling member, a suspension element-engaging member, and an elastomeric material disposed at least partially between the coupling member and the suspension element-engaging member. Preferably, the elastomeric material directly connects the coupling member to the suspension element-engaging member.

The suspension element-engaging member includes a base and a projection extending outwardly from the base. The projection of the suspension element-engaging member includes first and second edge portions wherein at least a section of the first edge portion and at least a section of the second edge portion converge moving in a first direction away from the base.

The first portion of the first edge portion may be inclined at a first angle relative to the base and the second portion of the second edge portion may be inclined at a second angle relative to the base, the second angle being smaller than the first angle.

The first edge portion may also include a first section inclined at a first angle relative to the base and a second section positioned further from the base than the first section and inclined at a second angle relative to the base, the second angle being smaller than the first angle. In this implementation, the first edge portion may include a recurved section. The recurved section may have an S-shaped section.

The coupling member and base may each include a plate. The base may include first and second major surfaces, with the suspension-engaging member or projection extending outwardly from the second major surface of the base. The base may be generally plate-like and may include elastomeric material adjacent to the second major surface of the base. The elastomeric material between the coupling member and the suspension element-engaging member and the elastomeric material adjacent to the second major surface of the base may be the same material, which may be rubber having a durometer of about 68 on the Shore A Scale. The base and the suspension-engaging projection may be of unitary monolithic one-piece construction.

In still other implementations, a suspension deflection assembly is provided for a suspension element that includes at least one leaf spring provided with a suspension element opening in the form of a slot which is elongated in a direction corresponding to the longitudinal axis of the leaf spring. A projection extending from the assembly may be sized for insertion into the slot, and may not require any nuts or other retention members mounted to it for retaining it within the slot.

Other implementations provide a suspension deflection assembly for coupling a suspension element to a frame member of a vehicle in which the assembly includes a housing. The housing is for coupling the assembly to the frame member. The housing includes first and second leg portions for projection in a first direction away from the frame member. The assembly also includes first and second supports. The first support is coupled to the housing, and the second support is spaced in the first direction away from the first support. An elastomer is positioned at least partially between the first and second supports and couples the first support to the second support. A projection extends from the second support in the first direction and is sized for insertion into a suspension element opening.

This implementation also includes a stop spaced in the first direction from the second support and extending at least partially between the first and second leg portions, the stop being positioned such that at least a portion of the suspension element is disposed between the second support and the stop.

The housing may be of a plural piece construction. The housing may include, as part of the first leg portion, a first housing section adapted for mounting to the frame member. The housing may also include, as part of the second leg portion, a second housing section including a mounting bracket for coupling the second housing portion to the frame member. The housing is preferably of an inverted U-shaped configuration when mounted to the frame member, with the first and second leg portions extending downwardly relative to the frame member, with the frame member preferably including a vehicle frame rail. The projection may also include first and second edges with respective portions that converge as the projection extends away from the frame member.

Further implementations of the suspension deflection assembly provide for coupling a suspension element having a suspension element opening to a frame member of a vehicle. The assembly preferably includes a first support for coupling the assembly to the frame member, a second support comprising a projection extending in a direction away from the frame member, a resilient material coupling the first and second supports together, and a projection extending into the suspension element opening without any retainer mounted to the projection for retaining the projection in the suspension element opening. The suspension deflection assembly may also include a stop coupled to the frame member and positioned below the suspension element so as to prevent the suspension element from falling free of the projection while still permitting movement of the suspension element relative to the projection. The suspension element may be a leaf spring, and the suspension element opening may be a slot elongated in the direction of the longitudinal axis of the leaf spring such that the projection fits closely within the leaf spring opening while permitting movement of portions of the leaf spring in a direction away from the frame member as a result of various loading conditions on the suspension.

In still other implementations, a suspension deflection system provides for coupling a suspension member with an opening to a frame member of a vehicle and includes a mount adapted for coupling the system to the frame member. The system preferably includes first and second supports. The first support may be coupled to the mount. The mount may also include first and second spaced-apart legs positioned to at least partially surround the first and second supports. A resilient deflection member may be disposed at least partially between the first and second supports. A motion restraint member may extend away from the second support, the motion restraint member being sized for insertion into the opening of the suspension member. The motion restraint member may include respective first and second portions that taper toward one another and which are inserted into the opening. The motion restraint member may be tooth shaped. The mount may also include first and second spaced-apart legs positioned to at least partially surround the first and second supports. The suspension deflection assembly may also include a suspension retainer spaced from the motion restraint member and coupled to the first and second legs and located such that a portion of the suspension member is positioned between the second support and the suspension retainer. The motion restraint member may be tooth shaped. The suspension deflection assembly may include a mounting bracket coupling at least a portion of the mount to the frame member.

DETAILED DESCRIPTION

With reference to the figures, several implementations of a suspension deflection system 10 according to the disclosure are shown. The suspension deflection system 10 is designed to couple a suspension member 20 to a vehicle frame 22 for efficient operation and in a way that facilitates mounting and assembly.

Figure 1:
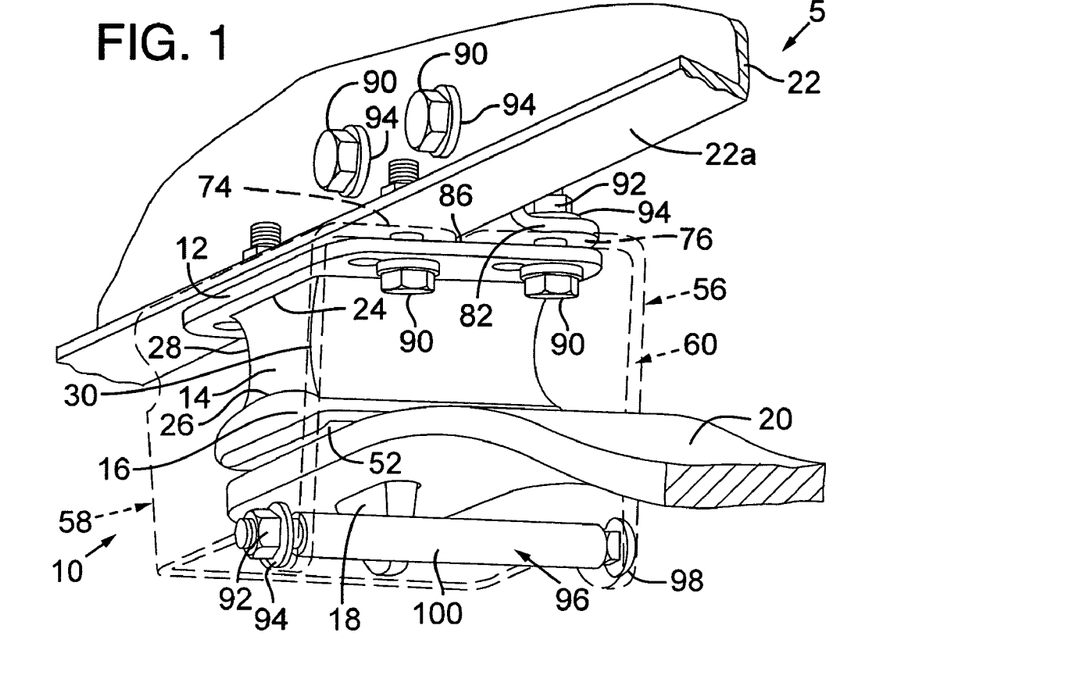
FIG. 1 is a perspective view of an implementation of a suspension deflection system showing a first support coupled to a vehicle frame and a second support coupled to the first support by an elastomeric body and having a projection extending through a slot in a suspension member, with a housing for the system shown in dashed lines.

As illustrated in FIG. 1, the system 10 includes a first support 12 coupled to the vehicle frame 22, a second support or base 16 spaced from the first support 12 and having a projection 18 that extends through a slot in the suspension member 20. The first support 12 and the second support 16 are coupled together by a resilient elastomeric body 14 positioned at least partially within the region between the spaced apart supports 12, 16.

The elastomeric body 14 includes first and second opposed body end surfaces 24 and 26, respectively coupled to the first and second supports 12 and 16. The elastomeric body 14 also includes first and second body side surfaces 28 and 30 extending between the body end surfaces 24 and 26, the body side surfaces 28 and 30 being closer to each other at a location intermediate the body end surfaces 24 and 26 than at the first and second supports 12 and 16. In the illustrated implementation, the first and second body side surfaces 28 and 30 are inwardly curved, are concave and are curved inwardly by approximately the same distance. Preferably, the elastomeric body 14 is made of rubber and may have a durometer of about 68 on the Shore A Scale.

Figure 3:
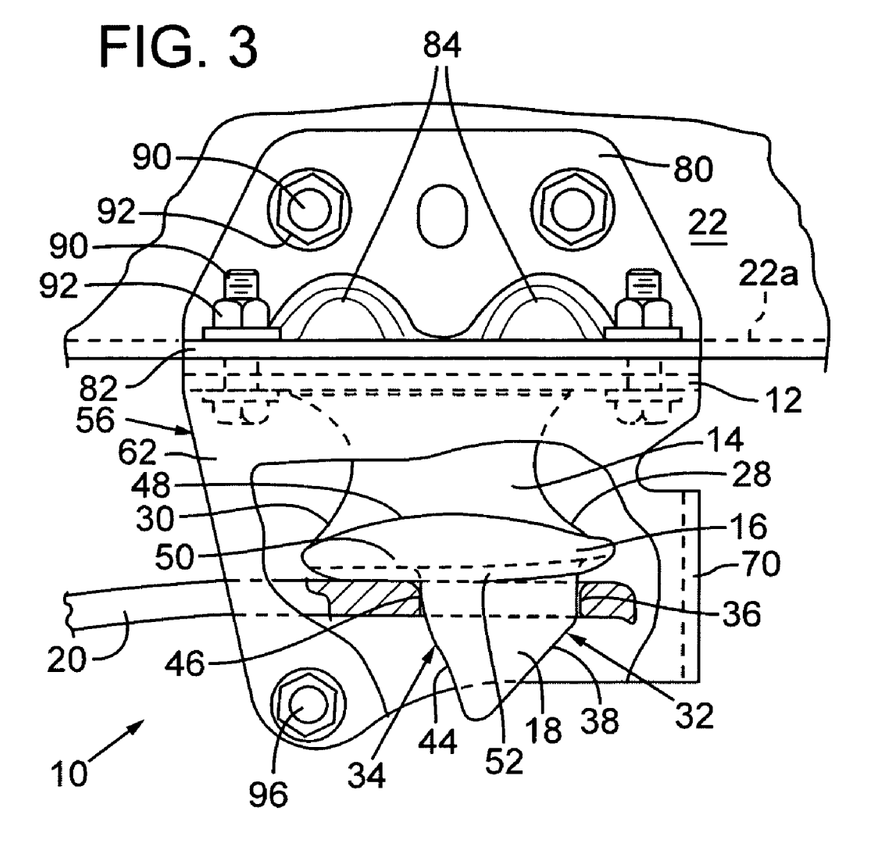
FIG. 3 is a right side elevational view of the suspension deflection system of FIG. 2 shown partially in section.

FIG. 3 best illustrates the projection 18 extending in a direction away from second support 16, in this case a downward direction. The projection 18 includes first and second converging edge portions 32 and 34. More specifically, the first edge portion 32 includes a first section 36 inclined at a first angle relative to the second support 16 as well as an adjacent second section 38 farther from the second support 16. The second section 38 is inclined at a second angle relative to the second support 16, the second angle being less than the first angle. The first angled section 36 forms a section that may be roughly referred to as a shoulder section. This configuration is beneficial because it facilitates coupling of the suspension deflection system 10 to the suspension member 20.

As is further illustrated in FIG. 3, the second edge portion 34 includes a recurve section 44 as well as a shoulder section 46. The benefits of this shape, as well as the shape of the first edge portion 32 will be discussed below.

Figure 4:
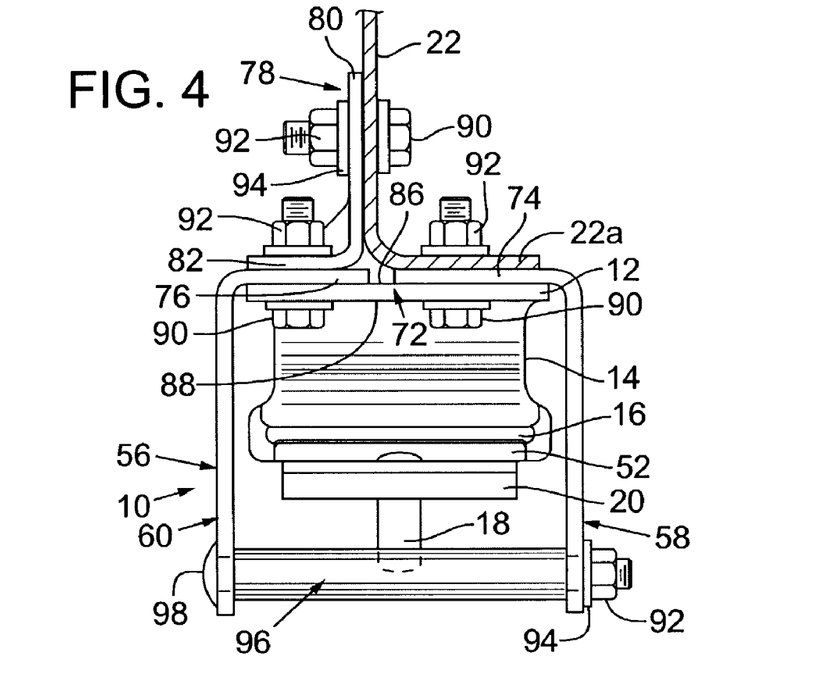
FIG. 4 is an elevational view of the suspension deflection system of FIG. 2 viewed from the direction of arrow 4, showing the projection extending through the slot.
Figure 5:
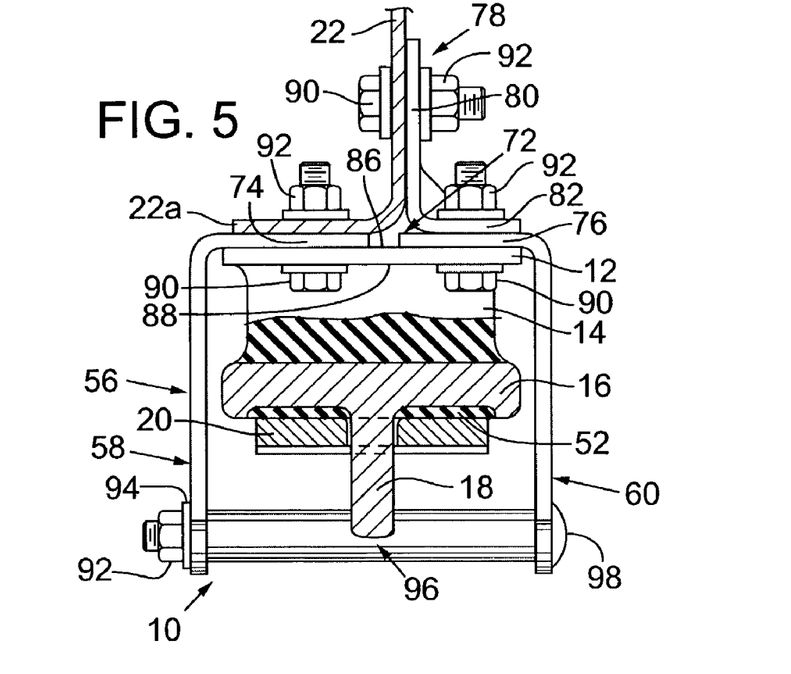
FIG. 5 is an elevational view of the suspension deflection system of FIG. 1 viewed from the direction of arrow 5 and shown partially in section.

FIG. 3 also best illustrates the features of one implementation of the second support 16. The second support 16 has a first surface 48 and a generally opposite second surface 50. The first surface 48 is curved, as is the second surface 50. As seen in FIGS. 4 and 5 of the illustrated implementation, the elastomeric body 14 is coupled to the second support 16 and includes a section 52 that extends beyond the second surface 50 of the second support 16. Thus, a portion of the elastomeric body 14, i.e., the section 52, is disposed between the second support 16 and the suspension member 20. Of course, the section 52 could be separate from the rest of the body 14.

The disposition of the section 52 of the elastomeric body 14 between the second surface 50 of the second support 16 and the suspension member 20 reduces noise that would be associated with a metallic contact as well as reducing the amount of slip between the respective surfaces. As best shown in FIG. 5, the second support 16 and the projection 18 are of unitary monolithic one-piece construction.

Some of the benefits of the implementations thus described are the associated interaction with the suspension member 20. One of such benefits is due to the shape of the projection 18 previously described, while another of such benefits is due to the shape of the elastomeric body 14 and the curved surfaces 44 and 46 of second support 16. Such benefits are more easily illustrated with reference to the loading of the suspension deflection system.

Figure 6:
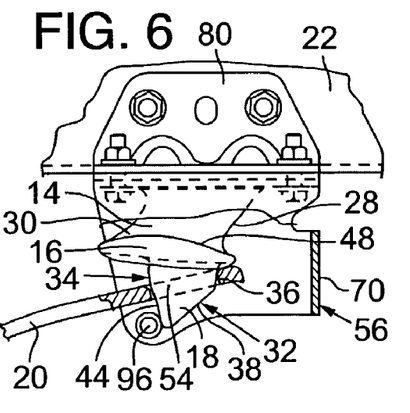
FIGS. 6-10 are side elevational views similar to FIG. 3, except showing the elastomeric body in different positions while in use.
Figure 7:
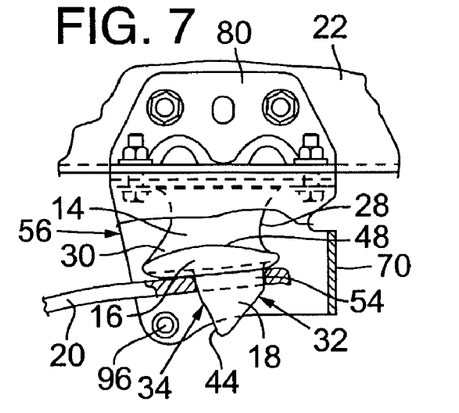
Figure 8:
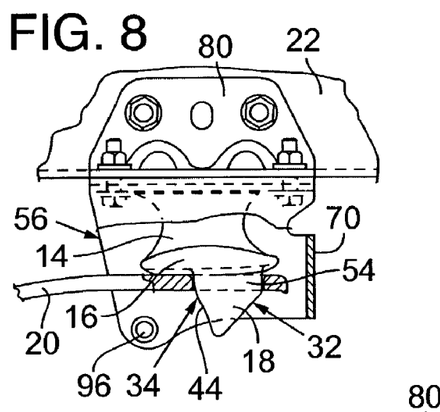
Figure 9:
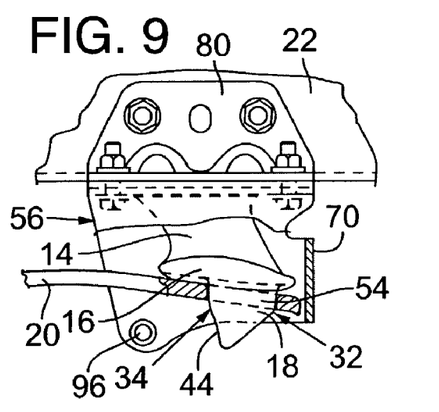
Figure 10:
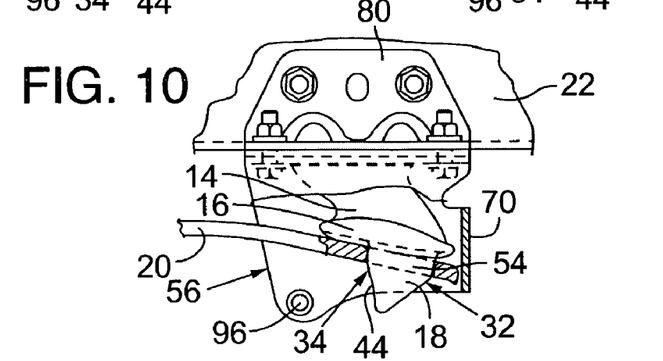

As seen in FIGS. 6-10, in one implementation an attached end of the suspension member 20 follows a nearly arcuate path as it travels through its range of loading. More specifically, FIG. 6 depicts the suspension deflection system 10 in an unloaded condition. Similarly, FIG. 7 depicts an implementation wherein the suspension deflection system 10 is at half its rated load, FIG. 8 depicts the suspension deflection system 10 at its rated load, FIG. 9 depicts the suspension deflection system 10 at one and one-half times its rated load, and FIG. 10 depicts the suspension deflection system 10 at twice its rated load. As seen in the figures, a movable end of the suspension deflection system comes to rest in a particular position along the arcuate path determined by the present loading experienced by the system.

As best seen in FIG. 6, one benefit of the shape of an implementation of the projection 18 is ease of mounting. FIG. 6 depicts the suspension deflection system 10 in its unloaded condition. The converging portions 38 and 44 of the first and second edge portions 32 and 34 facilitate introduction of the projection 18 into an opening 54 defined in the suspension member 20. Once the projection 18 is introduced into the opening 54 in the suspension member 20, it may be necessary to "preload" the elastomeric body 14. The recurved section 44 of the second edge portion 34 facilitates this preload by gradually increasing the amount of the projection 18 engaging the opening 54 as the shoulder portion 36 of the first edge 32 facilitates this preload by engaging the opening 54.

One benefit of the inwardly curved body side surfaces 28 and 30 with the curved first surface 48 of the second support 16 in the present implementation is that a major portion of the elastomeric body 14 experiences mainly shear loads rather than tensile or compressive loads. Such loading provides for increased life of the elastomeric body 14.

Figure 2:
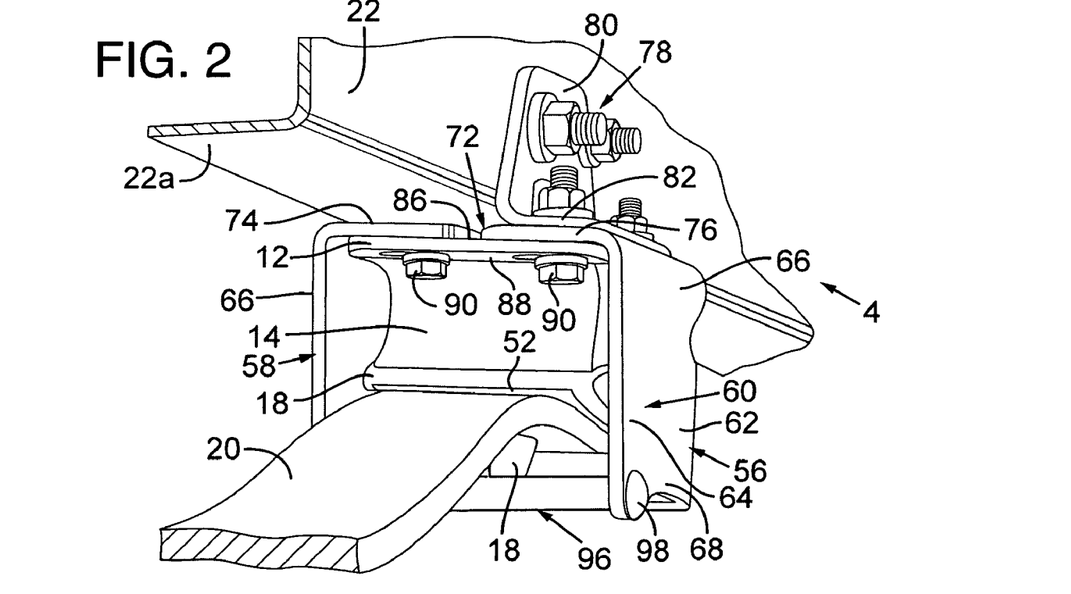
FIG. 2 is a perspective view of the suspension deflection system of FIG. 1 viewed from the opposite end with the housing shown in solid lines.

Now referring to FIGS. 1 and 2, it may be beneficial to provide a housing, e.g., a housing 56 that surrounds at least a portion of the second support 16. The housing 56 provides an optional but convenient way, e.g., to mount a stop 96, which is described below in greater detail. The housing 56 also helps reduce the amount of road debris that enters the system.

Some implementations of the housing 56 include first and second spaced apart leg portions 58 and 60. Referring to FIG. 2, the spaced apart legs 58 and 60 each include rear sections 62 and front sections 64 as well as upper sections 66 and lower sections 68. In the present implementation, the housing further includes a rear portion 70 (see FIG. 3) between the front sections 62 of the spaced apart legs 58 and 60 and a top portion 72 between the upper sections 66 of the spaced apart legs 58 and 60. As illustrated, the top housing portion 72 of the housing is split into two sections 74 and 76. The vehicle frame 22 also includes a frame rail 22a extending away from the vehicle frame 22. This implementation also makes use of a supplemental support 78. The supplemental support 78 includes a first portion 80 coupled to the vehicle frame 22 and second portion 82 extending away from the first portion 80 adapted to be coupled to the top portion 72 of the housing 56. The supplemental support 78 further includes support darts 84, for reinforcement of the supplemental support 78. The support darts 84 are best shown in FIG. 3.

As described above, it may be beneficial to provide a stop that limits travel of the suspension member in the fore and aft direction. In some implementations, the stop is coupled to the vehicle frame and positioned to come into contact with and prevent further movement of the projection 18, thus restraining movement of the suspension member 20 engaged by the projection 18.

As one example, a stop 96 as shown, e.g., in FIGS. 1-6, can be positioned to extend at least partially between the spaced apart legs 58 and 60 such that least a portion of the suspension element 20 is disposed between the second support 16 and the stop 96. In the illustrated example, the stop 96 is a bolt 98 with a sleeve 100, the stop 96 being secured to the spaced apart legs 56 and 58 by a nut 92 and a washer 94.

FIG. 6 depicts the suspension deflection system 10 in an unloaded condition. In the event of a rear collision, i.e., an impact from the right side of the figure, the projection 18 would engage the stop 96 thereby preventing further movement of the suspension member 20 toward the front of the vehicle. Similarly, in the event of elastomeric failure in a vertical direction (not shown), the stop 96 would engage the suspension element 20 thereby preventing (or at least reducing) further travel of the suspension element 20 away from the vehicle frame 22. FIG. 10 shows the suspension deflection system at twice its rated condition. As can be seen, in the event of a front collision or other overloading, positioning a structure such as the front portion 70 of the housing 56 will prevent or at least retard further travel of the suspension element 20.

Although it is desirable for the suspension deflection system 10 to include the housing 56, it will be recognized by those of skill in the art that the system 10 may be mounted without the use of the housing 56 by mounting the first surface 86 of the first support directly to the frame rail 22a and to the supplementary support 78. This implementation can be envisioned by reference to FIG. 1, wherein the suspension deflection system 10 does not include the housing 56 (shown with dotted lines) or the stop 96.

With respect to manufacture of the suspension deflection system, formation of each of the parts is well known to those of skill in the art. The elastomeric body may be formed by well-known molding techniques or any other suitable method. The first and second supports, the projection, the supplementary support, and the stop are preferably made of steel and may be formed by well-known casting or milling processes or by any other suitable method. The second support and the projection may be of unitary monolithic and one-piece construction, and may be coupled to the elastomeric body by co-molding the second support/projection with the elastomeric body. The first support may also be coupled to the elastomic body by co-molding. The housing is also preferably made of steel and may be formed from a single piece material that is cut and then formed to shape.

In one implementation as best shown in FIGS. 4 and 5, the system is assembled as follows. As described above, in one preferred implementation, the projection 18 and the second support 16 may be of unitary monolithic on-piece construction. In this implementation, the elastomeric body 14 may be co-molded with the projection/second support and the first support 12 to form a sub-assembly. This sub-assembly may then be coupled to the frame 22 and the suspension member 20.

The first surface 86 of the first support 12 is coupled to both split sections 74 and 76 of the top portion 72 of the housing 56. The first split portion 74 of the housing 56 is further coupled to the frame rail 22a while the second split portion 76 is further coupled to the second portion 82 of the supplementary support 78. The supplementary support 78 is then coupled to the vehicle frame 22 by way of the first portion 80 of the supplementary support 78.

In the illustrated implementation, the coupling is achieved with threaded fasteners. Bolts 90 extend through the first support 12, the first split housing section 74 and the frame rail 22a and are secured by nuts 92 and washers 94. Bolts 90 also extend through the first support 12, the second split housing section 76 and the second portion 82 of the supplementary support 78 and are secured by nuts 92 and washers 94. Bolts 90 also extend through the first portion 80 of the supplementary support 78 and the vehicle frame 22 and are similarly secured by nuts 92 and washers 94.

If necessary, the system 10 can be removed from its installed state by:

(1) unbolting bolt 98 and removing stop 96, (2) lifting the frame member 22 relative to the spring member 20 to reduce the weight carried by the system 10, and (3) loosening bolts 90 connected to the frame 22 and the frame rail 22a.

Having illustrated and described the principles of our invention with reference to several exemplary embodiments, it should be apparent to those of ordinary skill in the art that the invention may be modified in arrangement and detail without departing from such principles. We claim all such modifications that fall within the scope of the following claims.

We claim:

1. A suspension deflection assembly for a vehicle comprising:
   a housing for mounting directly to and underneath a frame rail of the vehicle at a fixed location relative to the frame rail, the housing comprising first and second leg portions projecting downwardly in a first direction away from the frame rail;
   a mounting bracket connected to the housing and adapted to be connected to a longitudinal side of the frame rail;
   a leaf spring having an end portion and a trough opening in the end portion, the end portion extending into the housing between the first and second leg portions, wherein no other leaf springs extend into the housing;
   first and second supports disposed in the housing, the first support being coupled to the housing, the second support being spaced in the first direction away from the first support;
   an elastomeric body positioned at least partially between said first and second supports and coupling said first support to said second support, the elastomeric body being positioned in the housing between the first and second leg portions of the housing and below the frame rail, wherein the elastomeric body comprising first and second opposed body end surfaces coupled respectively to the first and second supports, the elastomeric body also comprising first and second body side surfaces extending between the body end surfaces, the body side surfaces being closer to one another at a location intermediate to the body end surfaces than at the first and second supports;
   a projection extending from said second support in the first direction and sized for insertion substantially in the first direction into and through the leaf spring through opening, wherein the assembly lacks any nuts or retention members mounted to the projection for retaining the projection within the through opening, the projection comprising a lower portion extending below the through opening, the lower portion having a generally triangular configuration and a maximum cross-sectional profile that is smaller than the through opening; and
   a stop spaced in the first direction from the second support, the stop being connected to and extending transversely between said first and second leg portions, the stop being positioned such that at least a portion of the leaf spring is disposed between the second support and the stop.

2. A suspension deflection assembly for coupling at least one leaf spring which defines a leaf spring through opening to a frame rail of a vehicle, the suspension deflection assembly comprising:
   a housing defining plural fastener receiving openings adapted to receive fasteners there through at least two of the fasteners passing through the frame rail to mount the housing to the frame rail at a fixed location relative thereto, the fasteners substantially restraining the housing against movement toward or away from the frame with flexing of the at least one leaf spring, the housing comprising first and second leg portions projecting downwardly in a first direction away from the frame rail, an end portion of the at least one leaf spring extending into the housing between the first and second leg portions;
   first and second supports, the first support being coupled to the housing, the second support being spaced in the first direction away from the first support;
   an elastomeric body positioned at least partially between said first and second supports and coupling said first support to said second support, the elastomeric body being positioned at least partially between the first and second leg portions of the housing and below the frame rail;
   a projection extending from said second support in the first direction and sized for insertion substantially in the first direction into and through the leaf spring through opening, the projection being movable in the leaf spring through opening as the at least one leaf spring flexes during operation of the vehicle; and
   a stop spaced in the first direction from the second support and extending at least partially between said first and second leg portions, the stop being positioned such that at least a portion of the at least one leaf spring is disposed between the second support and the stop;
   wherein the projection extends through the through opening without any retainer mounted to the lower end of the projection for retaining the projection in the opening;
   wherein the through opening comprises an elongated slot extending longitudinally of the at least one leaf spring, the projection closely fitting within the at least one leaf spring through opening while permitting movement of the at least one leaf spring in a second direction as a result of various loading conditions on the suspension;

wherein the projection is tooth-shaped and tapers from a first cross-sectional area adjacent the through opening to a smaller, second cross-sectional area spaced from the through opening;

wherein the projection comprises first and second generally triangular side portions and first and second converging edge portions extending between the first and second side portions; and the first edge portion including a first section inclined at a first angle relative to the second support and an adjacent second section further from the second support than the first section, the second section being inclined at a second angle relative to the second support, the second angle being less than the first angle.

3. The suspension deflection assembly according to claim 2 wherein the second converging edge portion includes a recurve section.

4. A suspension deflection assembly for coupling at least one leaf spring which defines a leaf spring through opening to a frame rail of a vehicle, the suspension deflection assembly comprising:

a housing for mounting to the frame rail, the housing comprising first and second leg portions projecting downwardly in a first direction away from the frame rail, an end portion of the at least one leaf spring extending into the housing between the first and second leg portions;

first and second supports, the first support being coupled to the housing, the second support being spaced in the first direction away from the first support;

an elastomeric body positioned at least partially between said first and second supports and coupling said first support to said second support, the elastomeric body being positioned at least partially between the first and second leg portions of the housing and below the frame rail;

a projection extending from said second support in the first direction and sized for insertion substantially in the first direction into and through the leaf spring through opening, said projection being movable in the slot as the at least one leaf spring flexes during operation of the vehicle;

a stop spaced in the first direction from the second support and extending at least partially between said first and second leg portions, the stop being positioned such that at least a portion of the at least one leaf spring is disposed between the second support and the stop;

wherein the projection comprises first and second generally triangular side portions and first and second converging edge portions extending between the first and second side portions;

the first edge portion including a first section inclined at a first angle relative to the second support and an adjacent second section further from the second support than the first section, the second section being inclined at a second angle relative to the second support, the second angle being less than the first angle.

5. The suspension deflection assembly of claim 4, wherein no more than one leaf spring extends into the housing between the first and second leg portions.

6. The suspension deflection assembly of claim 4, in combination with a frame rail and wherein the housing is directly mounted to the frame rail by at least plural bolts that pass through the housing and through a portion of the frame rail.

7. The suspension deflection assembly of claim 4, wherein the through opening comprises an elongated slot extending longitudinally of the at least one leaf spring, the projection closely fitting within the at least one leaf spring through opening while permitting movement of the at least one leaf spring in a second direction as a result of various loading conditions on the suspension.

8. The suspension deflection assembly of claim 4, wherein the at least one leaf spring can move longitudinally relative to the stop in a direction of travel of the vehicle, and the stop is connected to and extends transversely between the first and second leg portions of the housing at a position underneath the at least one leaf spring and spaced from the projection, the stop and projection being sized and positioned to engage one another to limit motion of the at least one leaf spring in the direction of travel of the vehicle under certain vehicle loading conditions.

9. The suspension deflection assembly of claim 4, wherein the leaf spring is slidable relative to the projection upon deflection of the suspension deflection assembly.

10. The suspension deflection assembly of claim 4, wherein the leaf spring can move longitudinally relative to the stop in a direction of travel of the vehicle, wherein the stop and projection are sized and positioned to engage one another to limit movement of the leaf spring in the direction of travel of the vehicle under at least one vehicle operating condition.

11. The suspension deflection assembly of claim 4, further comprising a mounting bracket connected to the housing and configured to be mounted to a longitudinal side of the frame rail, a plurality of mounting bolts passing through the housing and through the mounting bracket and a plurality of mounting bolts passing through the housing and through the frame rail so as to mount the housing to the frame rail.

12. The suspension deflection assembly of claim 4, wherein the projection comprises a proximal portion adjacent the support and a distal end portion spaced from the second support, the distal end portion having a generally triangular configuration.

13. The suspension deflection assembly of claim 4, wherein the elastomeric body comprises upper and lower opposed body end surfaces, the elastomeric body also comprising first and second body side surfaces extending between the body end surfaces, the body side surfaces being closest to one another at a location intermediate to the body end surfaces.

14. The suspension deflection assembly according to claim 4 wherein the second converging edge portion includes a recurve section.

15. The suspension deflection assembly according to claim 4 wherein projection is positioned in the through opening and between the stop and the end of the end portion of the leaf spring that extends into the housing.

16. The suspension deflection assembly according to claim 4 wherein the projection comprises a tooth, the stop is positioned below the end portion of the leaf spring that extends into the housing, the end portion of the leaf spring that extends into the housing having a distal end positioned within the housing, and the tooth being positioned between the distal end and the stop.

17. The suspension deflection assembly according to claim 4 wherein the stop comprises a pin extending between the first and second leg portions.

18. The suspension deflection assembly according to claim 4 wherein the stop is positioned at the side of the housing adjacent to the location where the end portion of the leaf spring enters the housing.

* * * * *